United States Patent [19]

Champness et al.

[11] Patent Number: 5,715,895
[45] Date of Patent: Feb. 10, 1998

[54] DOWNHOLE DRILLING TOOL COOLING SYSTEM

[76] Inventors: Elwood Champness, 5279 Fallgatter, Bakersfield, Calif. 93305; Al T. Champness, 9501 Laurel Oak Way, Bakersfield, Calif. 93311

[21] Appl. No.: 636,322

[22] Filed: Apr. 23, 1996

[51] Int. Cl.$^6$ ..................................................... E21B 21/00
[52] U.S. Cl. ............................................ 175/17; 166/57
[58] Field of Search ................................. 175/17, 40, 24; 166/302, 57

[56] References Cited

U.S. PATENT DOCUMENTS

| | | | |
|---|---|---|---|
| 2,621,022 | 12/1952 | Bardill . | |
| 3,679,929 | 7/1972 | Holm et al. | 315/5.38 |
| 3,774,701 | 11/1973 | Weaver . | |
| 3,820,605 | 6/1974 | Barber . | |
| 4,215,753 | 8/1980 | Champness | 175/17 |
| 4,220,202 | 9/1980 | Aladiev . | |
| 4,276,936 | 7/1981 | McKinzie | 166/303 |
| 4,312,401 | 1/1982 | Zebuhr | 165/39 |
| 4,693,313 | 9/1987 | Stephenson | 166/302 |
| 4,926,949 | 5/1990 | Forrest | 175/17 |
| 5,016,716 | 5/1991 | Donovan | 175/17 |
| 5,265,677 | 11/1993 | Schultz | 166/302 |

OTHER PUBLICATIONS

Koji Morita and Makoto Tago, Development of the Downhole Coaxial Heat Exchanger (DCHE) System: Potential for Fully Utilizing Geotheremal Resources, GRC Bulletin, Mar. 1995, pp. 83–92.

*Primary Examiner*—William P. Neuder
*Attorney, Agent, or Firm*—Kenneth J. Hovet

[57] ABSTRACT

A dual walled pipe string structure defines an annular cavity between the walls into which hard granules may be packed to oppose wall collapse when inserted to high pressure well depths. Segments of pipe thus constructed will reduce the heat transfer across the pipe string allowing for the conveyance of drilling mud from a surface cooler to a downhole tool. The rate of cooled drilling mud transfer to the tool may be controlled to match the heat transfer rates and the heat generated at the tool. To further oppose wall pressures inert gas at opposing pressure may be introduced into the interstices between the granules.

9 Claims, 4 Drawing Sheets

FIG—1

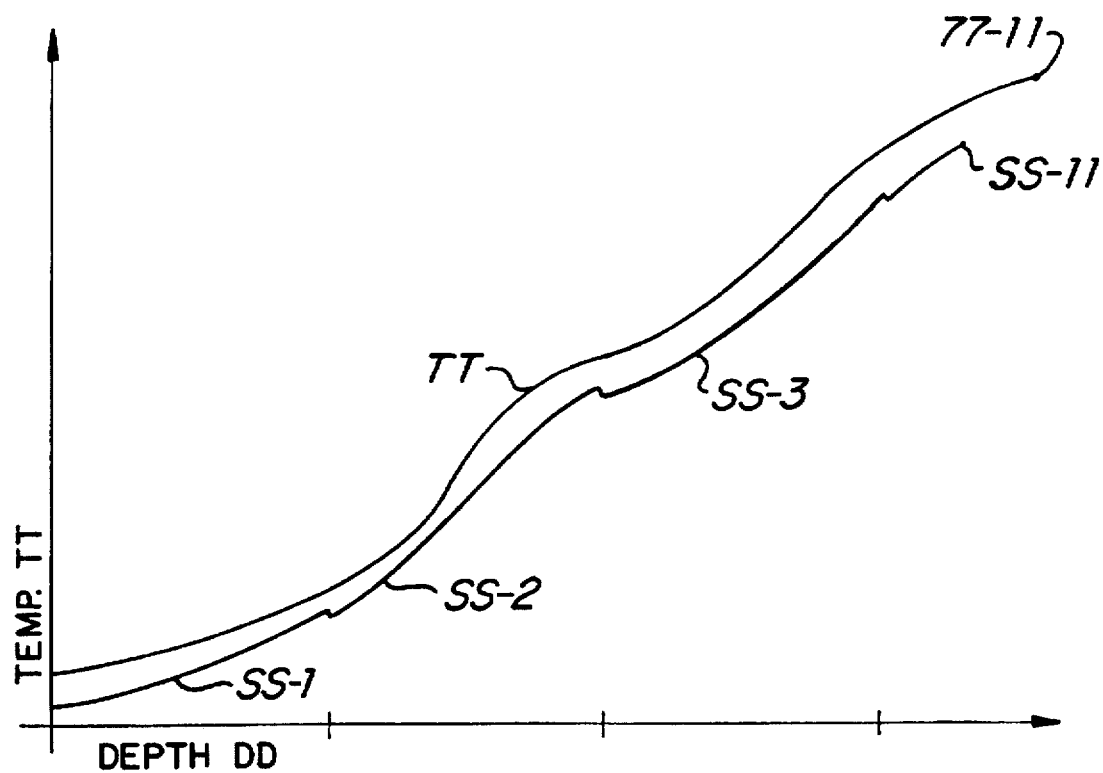
FIG.—5

DOWNHOLE DRILLING TOOL COOLING SYSTEM

BACKGROUND OF THE INVENTION

1. Field of the Invention

The present invention relates to well bore fluid cooling systems, and more particularly to heat exchange systems useful in cooling downhole tools in the course of drilling into geothermally heated strata.

2. Description of the Prior Art

The drilling of boreholes into the Earth's crust is a process in which cutting energy is expended at the downhole tool, the energy dissipation invariably raising the tool temperature. Along with the energy dissipation associated with drilling the local temperature of the borehole increases with depth, and the combination of the cutting tool temperature limit, the heat generated in the course of cutting, together with the increasing temperature profile in the borehole with depth become the limiting factor on the effectiveness of the drilling process. Simply, the effective temperature difference at the tool end becomes insufficient for successful heat exchange of the locally generated cutting heat and the cutting process eventually reaches impractical rates, setting the limit of effective penetration.

In the past drilling fluids were circulated through the drill pipe down to the tool, bringing back to the surface the cutting debris together with the entrained heat generated by cutting. As the depth increased the heat exchange directly across the drill pipe wall required further temperature chilling of the drilling fluid achieved in one example by a chilling system described in my prior U.S. Pat. No. 4,215,753. Without limitation, the foregoing chilling system circulated the drilling fluids through heat exchangers at the surface and then circulated the chillied fluid down the wellbore. While commercially successful, the circulation path nonetheless entails long drill pipe dimensions and the consequent heat transfer from the returning fluid to the chilled fluid, across the pipe wall, becomes significant with increased bore depths.

Associated with increasing depth is also the pressure within the wellbore. In fact, the drilling fluid, sometimes referred to as the drilling mud, is often augmented with high mass particulate matter in suspension in order to equlise the local static pressure in the bore. Thus the drill pipe is exposed to substantial pressures in a fluid entrained with cutting debris and density augmentation matter. These combined conditions limit any usefulness of known insulation coatings, and the heat transfer across the drill pipe wall is thus determined by the pipe material.

In the past various techniques have been devised which in one way or another insulate the well casing. Examples of such techniques may be found in the teachings of U.S. Pat. No. 3,820,605 to Barber et al; U.S. Pat. No. 4,693,313 to Stephenson et al; and U.S. Pat. No. 4,276,936 to McKinzie. While suitable for the purposes intended, each of the foregoing techniques fails to attend to the heat transfer rates across the drill pipe wall. The exchange between the chilled fluid pumped down the pipe and the returning fluid in the surrounding annulus of the bore is thus unattended.

Of those techniques directed at controlling the heat transfer to a downhole tool it has been the typical practice to provide tool shielding, as in the U.S. Pat. No. 5,016,716 to Donovan et al, or to enclose the tool in a jacket as in U.S. Pat. No. 4,926,949 to Forrest. While these examples are effective for the purposes intended, the heat transfer across the drill pipe has again had little attention. It is the technique for increasing the effective R factor of the drill pipe itself that is addressed herein, particularly attending the severe environments of deep well bores and those directionally angled, as in slant drilling.

SUMMARY OF THE INVENTION

Accordingly, it is the general purpose and object of the present invention to form a drill pipe structure for reduced heat transfer rates.

Other objects of the present invention are to provide insulated drill pipe conformed for exposure in a well bore.

Yet further objects of the present invention are to provide an insulated conveyance for chilled drilling fluids to a downhole tool.

Briefly, these and other objects are accomplished within the present invention by providing a surface deployed heat exchanger, generally of the type earlier described in my U.S. Pat. No. 4,215,753, including a fan cooled radiator exposed to a water misting array. The radiator is pump fed a flow of drilling mud from a local storage tank or pond, conveying its chilled output into the drill pipe string extending into a well bore. This flow of chilled drilling fluid is then useful in cooling the downhole tool.

Once significant depths are reached, however, the heat in the returning fluid surrounding the drill pipe exchanges with the chilled fluid conveyed down the pipe, and the fluid temperatures at the tool are too close to the local working temperature for effective cooling. This loss of cooling temperature difference is dominantly a function of the heat transfer rates across the drill pipe walls, as the length of the pipe string is a canonical object. Thus in deep well drilling the extremely high length to diameter ratios of the pipe string preclude effective compensation by increased pumping rate.

Those skilled in the art will note that the downhole environment of the pipe string is extremely severe. The temperatures increase with depth, as does the pressure, and the well fluid is laden with cutting particulate and density enhancing matter in suspension. Any coating of the pipe segments to increase insulation coefficients is thus quickly abraded away, or collapsed by the well pressures. This destructive environment is further exacerbated by the common preference for slant drilling, now dictated by environmental and aesthetic concerns. Thus pipe insulation by coating is a difficult object, limited by the material properties of the known insulative materials.

To provide insulative properties to the pipe string in these severe conditions, I have devised a pipe segment arrangement in which each segment is formed as a concentric dual wall cylinder. The gap between the inner cylinder and the outer cylinder is then filled with generally spherical silica beads, with the bead sizes determined by the well pressure to which the particular segment is exposed. The interstitial gaps between the silica granules can then receive an inert gas, at some pressure, to further oppose the collapse of the annular cavity between the walls. Accordingly, those pipe segments closer to the well surface that are exposed to lower pressures may receive a coarser granular fill, as the wall bridging span between the granules can be greater. In this manner a selection of the segment filler granule size can be made for fewer wall-to-granule contacts, thereby increasing the insulative qualities of the segment. As the segments extend into deeper parts of the well bore, where the well pressure is greater, smaller granulation of the silica fill offers smaller bridging spans to accomodate the higher pressure wall loadings, thus increasing crush resistance.

The segments are each terminated in the conventional threaded end connectors which also close the annular cavity. Thus an assortment of segments is provided which meets the increasing pressure loads with bore depth. In each instance, the packed granular filler and the dual wall structure combine to icrease the segment structural strength and some wall thickness reduction is therefore possible to reduce the string mass. The increased sectional rigidity of the segment, moreover, reduces the incidence of torsional buckling, an advantage of particular interest in slant drilling. Thus the insulation factor of each segment is increased, by a multiple of 4 or more, while the structural strength is also increased.

The doubled wall construction, additionally, allows for higher internal drilling fluid pressures, thus accomodating the use of downhole tools powered by the pumped drilling mud. The present inventive combination, therefore, accomodates the most rigorous concerns of deep well drilling.

BRIEF DESCRIPTION OF THE DRAWINGS

FIG. 5 is a graphical illustration of a temperature profile along the well bore.

DESCRIPTION OF THE PREFERRED EMBODIMENT

Figure 1:
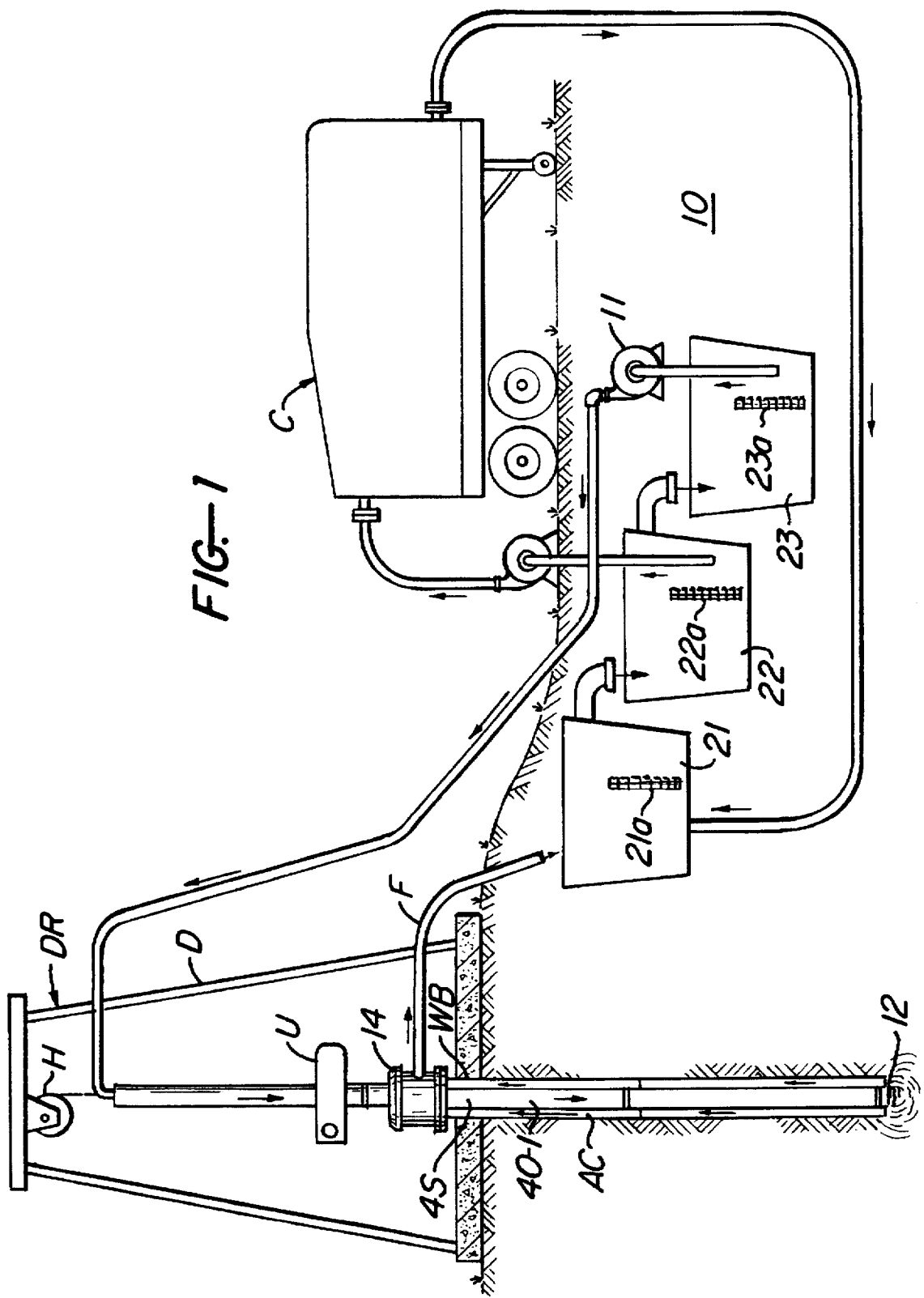
FIG. 1 is a diagrammatic illustration of a drilling fluid cooling assembly provided with insulative drilling pipe segments, in accordance with the inventive combination described herein.
Figure 2:
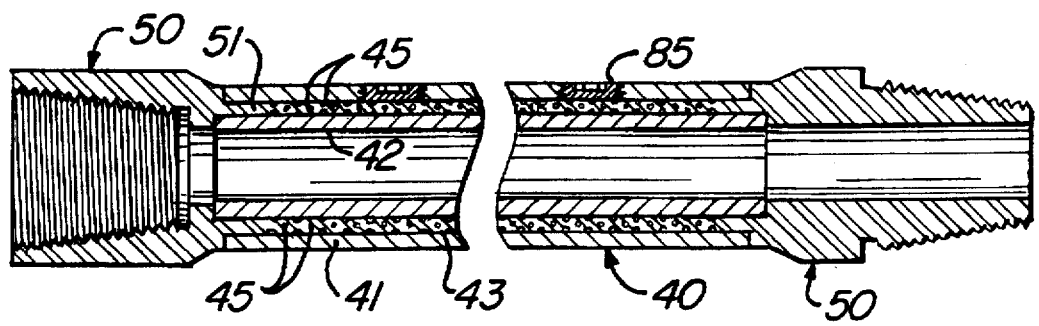
FIG. 2 is a sectional side view of a representative drill pipe segment useful with the invention herein.

As shown in FIGS. 1–5, inclusive, the inventive deep well drilling system, generally designated by the numeral 10, includes a drilling rig DR of conventional form provided with a derrick D, a hoist H, and a drive unit U to turn the drill pipe string PS within a well bore WB. Of course, in mud driven down hole motors torsional power at the surface may be omitted. By common practice drilling fluid or mud is conveyed to the exposed end of the string PS, by way of a mud pump 11, the fluid F passing to the cutting tool 12 at the lower end of the string, and from there returning upwardly through the well bore to the well head 14 to be then directed into settling tanks 21, 22 and 23 in which the cutting particulate is separated. A mobile chilling unit C, of the type earlier described by me in U.S. Pat. No. 4,215,753 then draws the separated drilling mud from the upper layers of tank 22, cooling same through misted heat exchangers and returning the cooled flow to tank 21. Tanks 21, 22, and 23 are provided with weirs 21a, 22a, and 23a, respectively, each conformed to collect the cuttings brought up from the well bore. The last stage of the settling and separating process, in tank 23, is then fed by pump 11 to the upper end of the pipe string PS.

This arrangement, therefore, both chills the drilling mud inchiller C and feeds it under pressure to the tool 12. Mud pressure operated down hole tools are therefore accomodated in the present arrangement.

In typical practice well bore WB is of a diameter greater than the pipe string PS, thus forming an annular cavity AC around the string. The drilling mud or fluid F emmitted at the tool 12 therefore passes to the surface in intimate contact with the pipe string PS. Heretofore, this intimate contact has resulted in substantial heat transfer from the returning flow to the chilled flow forced down the string. As result the benefit of cooling has been limited as the drilling depths increased. To increase the insulative qualities of the pipe string PS, an annular structure has been devised, generally exemplified by pipe segments 40-1, 40-2, and 40-3. Each of the segments 40-1, 40-2, and 40-3 is similar in its form, and like numbered parts describe like functioning structures. More precisely, each segment includes a tubular exterior shell 41 provided with a coaxial interior liner 42, shell 41 being separated from liner 42 by an annular space or cavity 43 within which a quantity of generally spherical silica, aluminum oxide, or other granules 45 is filled. The spherical diameter of granules 45 may be graded, segment 40-1 receiving the largest granules 45-1, segment 40-2 receiving smaller granules 45-2, and so on.

Both the upper and lower ends of the annular cavity 43 are closed by pressed insertion of a circular projection 51 at each interior threaded couplings 50. This pressed engagement may be controlled to a selected pressure, thus prestressing the annulus against collapse. Once thus compressed each threaded coupling 50 may be fixed in place by parallel expanded method, and inert gas, under pressure, may be further introduced between the interstices of the granules 45 through threaded ports 85. This sealed and pressurised cavity then increases in its internal pressure with increasing gas temperature, opposing the well bore pressures in the surrounding fluid. As illustrated in detail in FIG. 5 the typical well temperature profile T increases with depth, as does the pressure P. The inclusion of a confined quantity of gas in the annulus will therefore counteract wall collapsing exterior pressures.

Figures 3A, 3B:
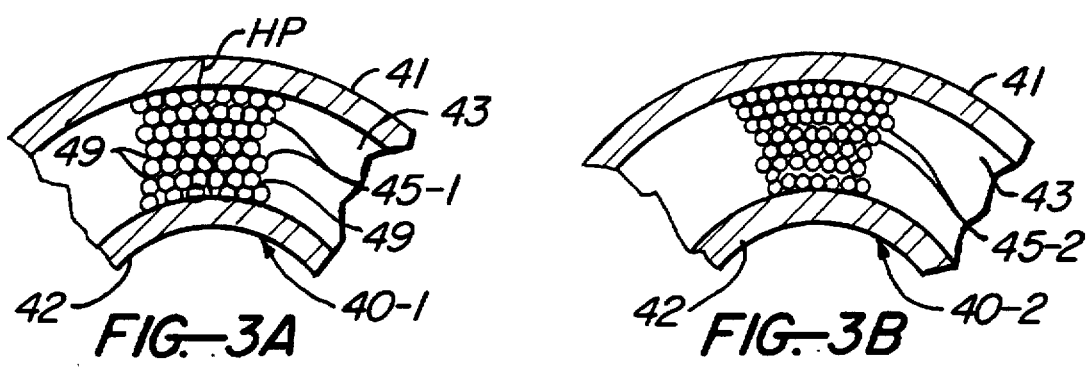
FIGS. 3a, 3b, and 3c are each sectional details illustrating the heat paths through a granular structural variety of annular pipe segment fill for use in accordance with the present invention.
Figure 3C:
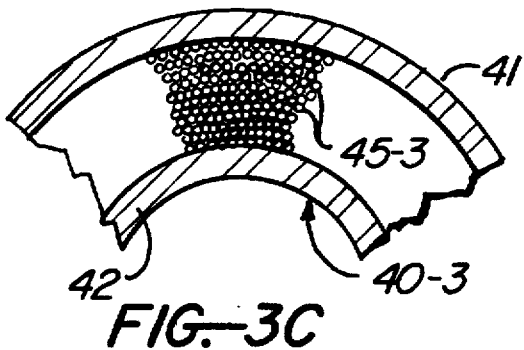

Further optimization may be effected by the selection of the granule size. As shown in FIGS. 3a, 3b, and 3c granules 45-1, 45-2, and 45-3 are each of a smaller dimension. The number of direct contacts 49 per unit surface area of the inner and outer concentric tubes 42 and 41, respectively, thus decreases in direct proportion to the granule size. The direct conductive heat exchange paths HP can thus be controlled by the selection of the granule size, the wall thickness of the inner and outer tubes, and their material selection. Of course, the lower well pressures closer to the surface accomodate better the larger granule 45-1, and segment 40-1 can thus be installed in that part of the pipe string PS. As deeper insertions are contemplated segments 40-2 or 40-3 can be installed. In each instance it is the intent to reduce the number of the direct contacts 49 where temperature differences between the downward flow and the return flow are the highest, avoiding the exponential paradox of conductive heat transfer. In this manner a pipe string may be formed by connecting segments 40-1, 40-2, and 40-3, into a string, the combination of the selected segment types being determined by the cooling requirements of the tool, the downhole temperature, and the thermal profile of the well.

Figure 4:
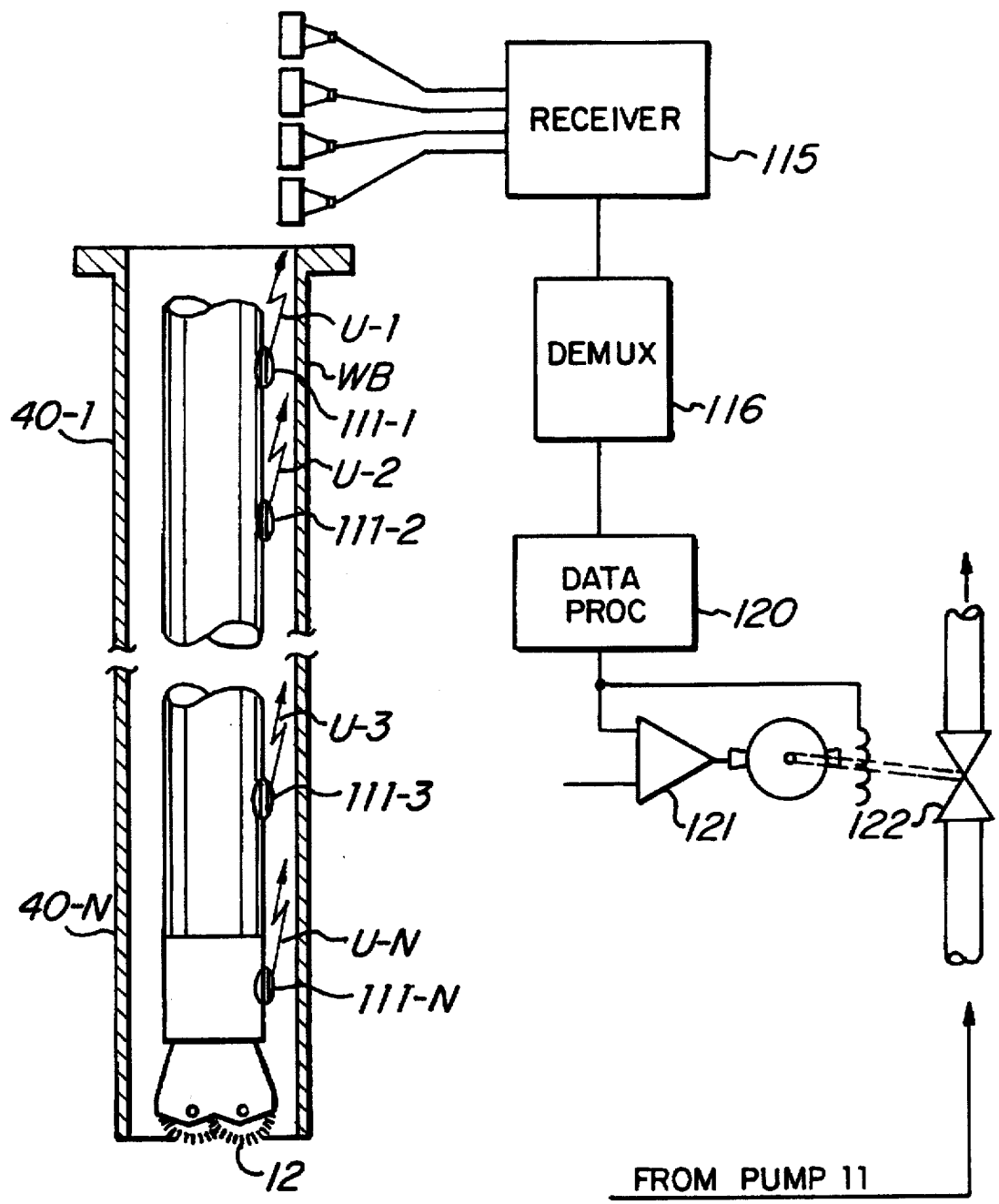
FIG. 4 is a control signal diagram in accordance with the present invention.

As shown in FIG. 4 these same input parameters may be sensed by an array of temperature sensors 111-1 to 111-n each connected to an ultrasonic encoding unit 112-1 10 112-n sending discretely coded ultrasonic signals U-1 to U-n up the well bore, through the drilling mud in the annulus surrounding the string. Signals U-1 to U-n are then received in a receiver stage 115 at the surface and through a demultiplexer 116 are then fed to a data processing stage 120. It is this data processor that then controls, through a servo loop 121 tied to a valve 122, the flow rate delivered by pump 11.

The data processing unit 120 may then be coded for the particular combination of segments 40-1, 40-2, and 40-3 and may then determine a weighted function set as follows $$PR=\Sigma(U\text{-}1*K1)+(U\text{-}2*K2)+(U\text{-}3*K3)+(U\text{-}n*Kn)+\ldots$$

where the sum PR is the pump rate signal and K1 to Kn are the weighting coefficients determined by the ambient temperature in the well and the heat transfer rate of the segment. In this manner the particular well temperature profile can be matched with the pumping rate, and the transfer rates at each level.

Thus as shown in FIG. 5 the temperature TT with depth DD is set out against the heat transfer slopes SS-1, SS-2, and SS-3 of the corresponding segments. Of course, those skilled in the art will know that the heat transfer rate is an exponential function of the temperature difference, and by selecting a correct segment combination the temperature difference at the tool 12 may be optimised. The foregoing arrangement, therefore, allows for a convenient matching of the array with the local heat gradient.

Obviously, many modifications and variations can be effected without departing from the spirit of the present teachings. It is therefore intended that the scope of the instant invention be determined solely by the claims appended hereto.

What is claimed is:

1. Apparatus for cooling a downhole tool inserted into a well bore at the end of a pipe string, comprising:
   a cooling assembly positioned on the ground surface adjacent said well bore;
   a storage structure mounted adjacent said well bore and conformed to receive well fluids therein and connected to convey said well fluids to said cooling assembly;
   a drilling rig supported over said well bore;
   pumping means connected between said cooling assembly and said pipe string;
   said pipe string comprising a plurality of pipe segments each conformed as a dual walled coaxial structure defined by an interior tubular member coaxially received within an exterior tubular member, said interior and exterior tubular members being separated from each other to form an annular cavity therebetween, an upper threaded fitting connected to the first end of said exterior member and including a central opening conformed to receive the first end of said interior member for parallel expansion thereof, a lower threaded fitting connected to the second end of said exterior member and including a central opening conformed to receive the second end of said interior member for parallel expansion thereof;
   temperature sensing means deployed adjacent said tool and said pipe string;
   logic means connected to receive signals from said temperature sensing means corresponding to the temperatures sensed at said tool and said pipe segments and for producing a control signal indicative of the combination thereof;
   control means connected to said pumping means and to receive said control signal for controlling the rate of said pumping means in correspondence with said control signal; and,
   a plurality of generally spherical granules received within said annular cavity.

2. Apparatus according to claim 1 wherein:
   said granules are generally of a single spherical dimension.

3. Apparatus according to claim 2 further comprising:
   a port formed in said exterior member for receiving inert gas under pressure.

4. Apparatus according to claim 1 wherein:
   said upper fitting of one of said segments being conformed for threaded engagement with said lower fitting of another one of said segments, said first end of said inner member of said one segment extending for compressive engagement with the second end of said inner member of said another one of said segments.

5. Apparatus for cooling a downhole tool inserted into a well bore at the end of a pipe string, comprising:
   a cooling assembly positioned on the ground surface adjacent said well bore;
   a storage structure mounted adjacent said well bore and conformed to receive well fluids therein and connected to convey said well fluids to said cooling assembly;
   a drilling rig supported over said well bore;
   pumping means connected between said cooling assembly and said pipe string;
   said pipe string comprising a plurality of pipe segments each conformed as a dual walled coaxial structure defined by an interior tubular member coaxially received within an exterior tubular member, said interior and exterior tubular members being separated from each other to form an annular cavity therebetween, an upper fitting connected to the first end of said exterior member and including a central opening conformed to receive the first end of said interior member for parallel expansion thereof, a lower fitting connected to the second end of said exterior member and including a central opening conformed to receive the second end of said interior member for parallel expansion thereof;
   said upper fitting of one of said segments being conformed for engagement with said lower fitting of another one of said segments, said first end of said inner member of said one segment extending for compressive engagement with the second end of said inner member of said another one of said segments; and,
   a plurality of generally spherical granules received within said annular cavity.

6. Apparatus according to claim 5 further comprising:
   temperature sensing means deployed adjacent said tool and said pipe string;
   logic means connected to receive signals from said temperature sensing means corresponding to the temperatures sensed at said tool and said pipe segments and for producing a control signal indicative of the combination thereof; and
   control means connected to said pumping means and to receive said control signal for controlling the rate of said pumping means in correspondence with said control signal.

7. Apparatus according to claim 6 wherein:
   said granules are generally of a single spherical dimension.

8. Apparatus according to claim 7 further comprising:
   a port formed in said exterior member for receiving inert gas under pressure.

9. Apparatus according to claim 8 wherein:
   said granules are formed of a ceramic material.

* * * * *